UNITED STATES PATENT OFFICE.

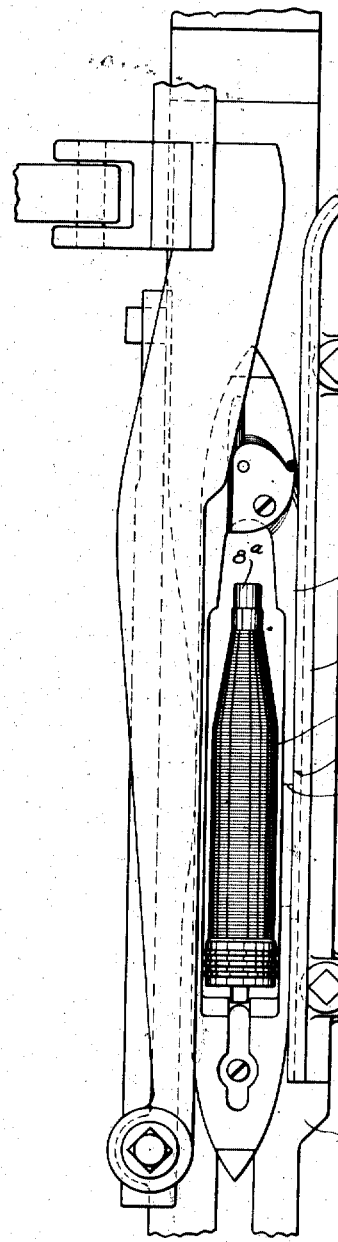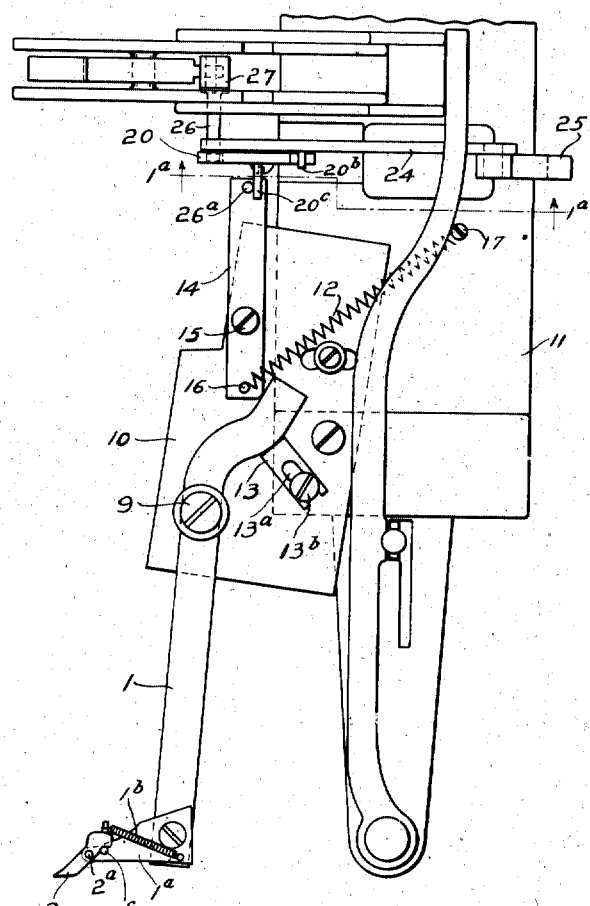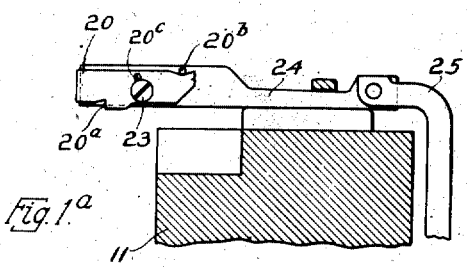

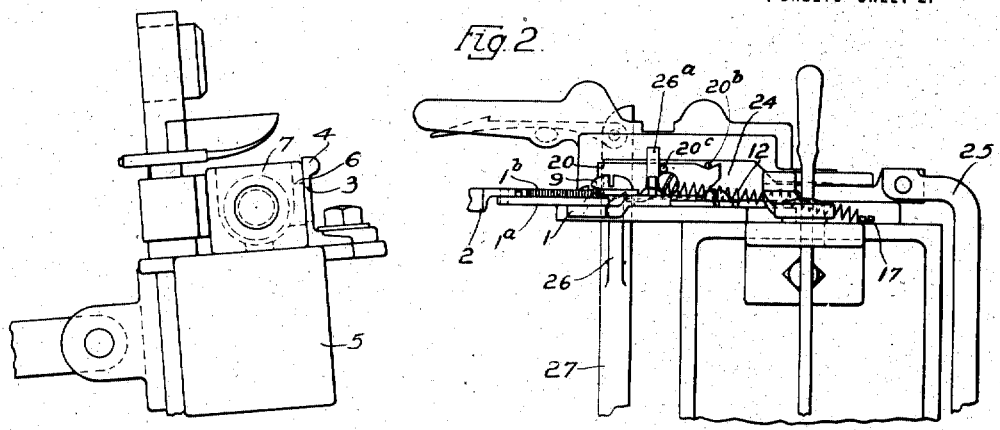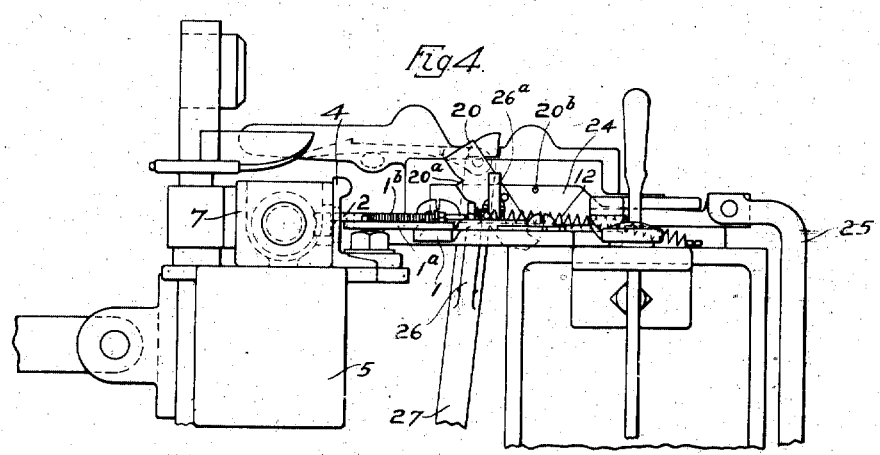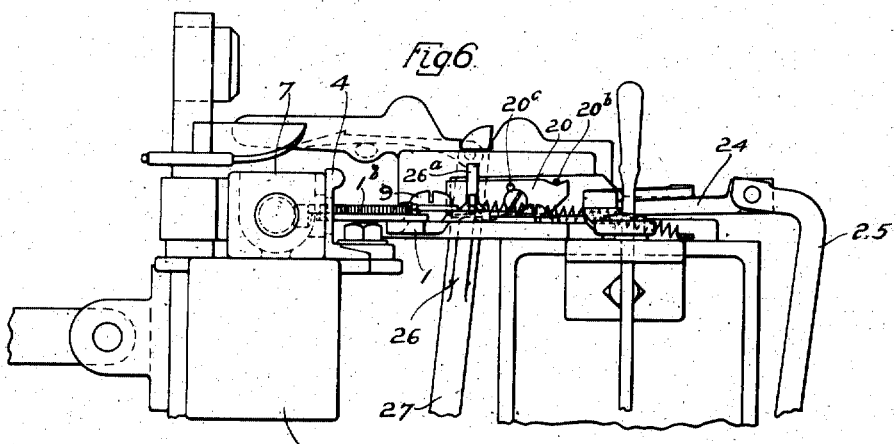

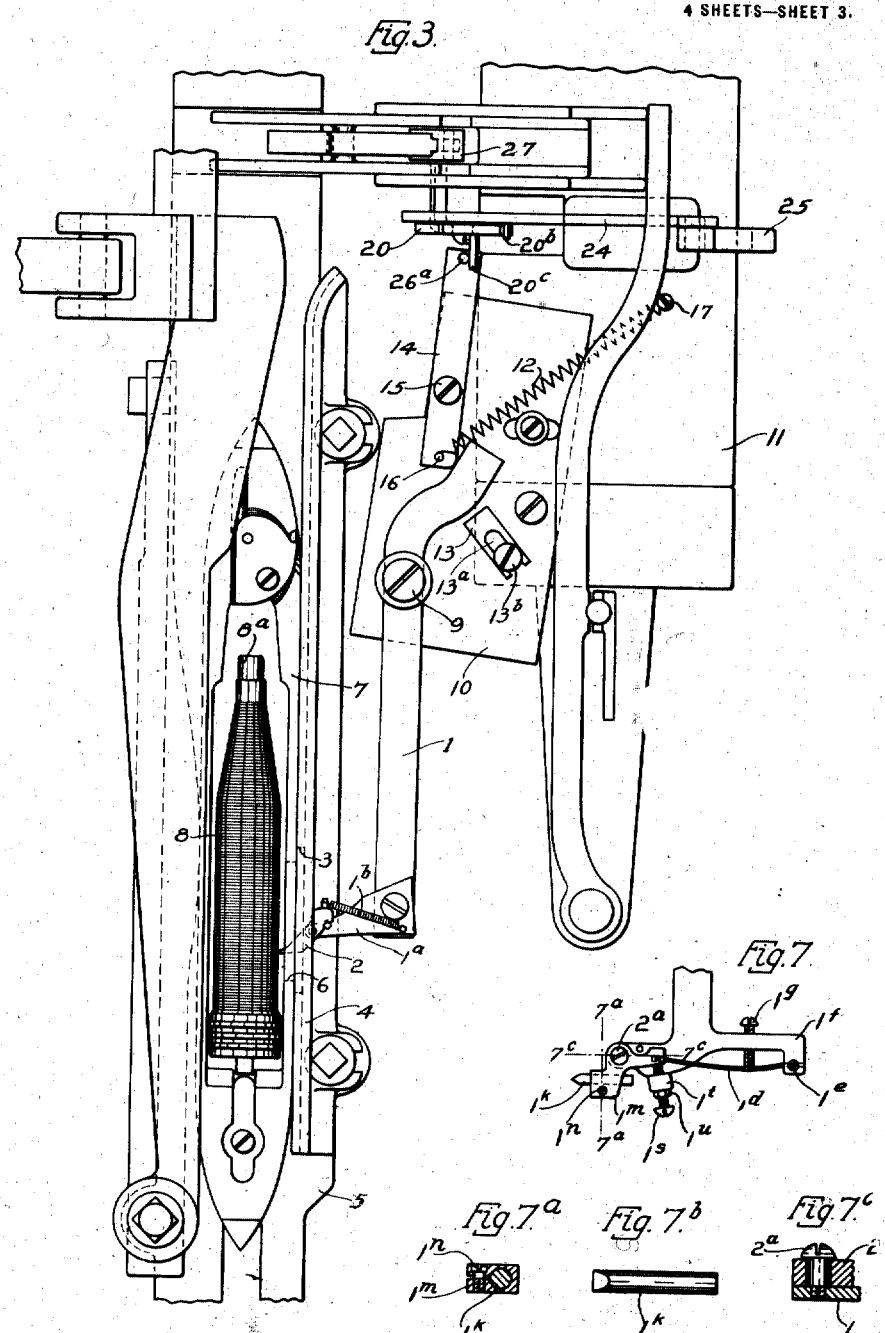

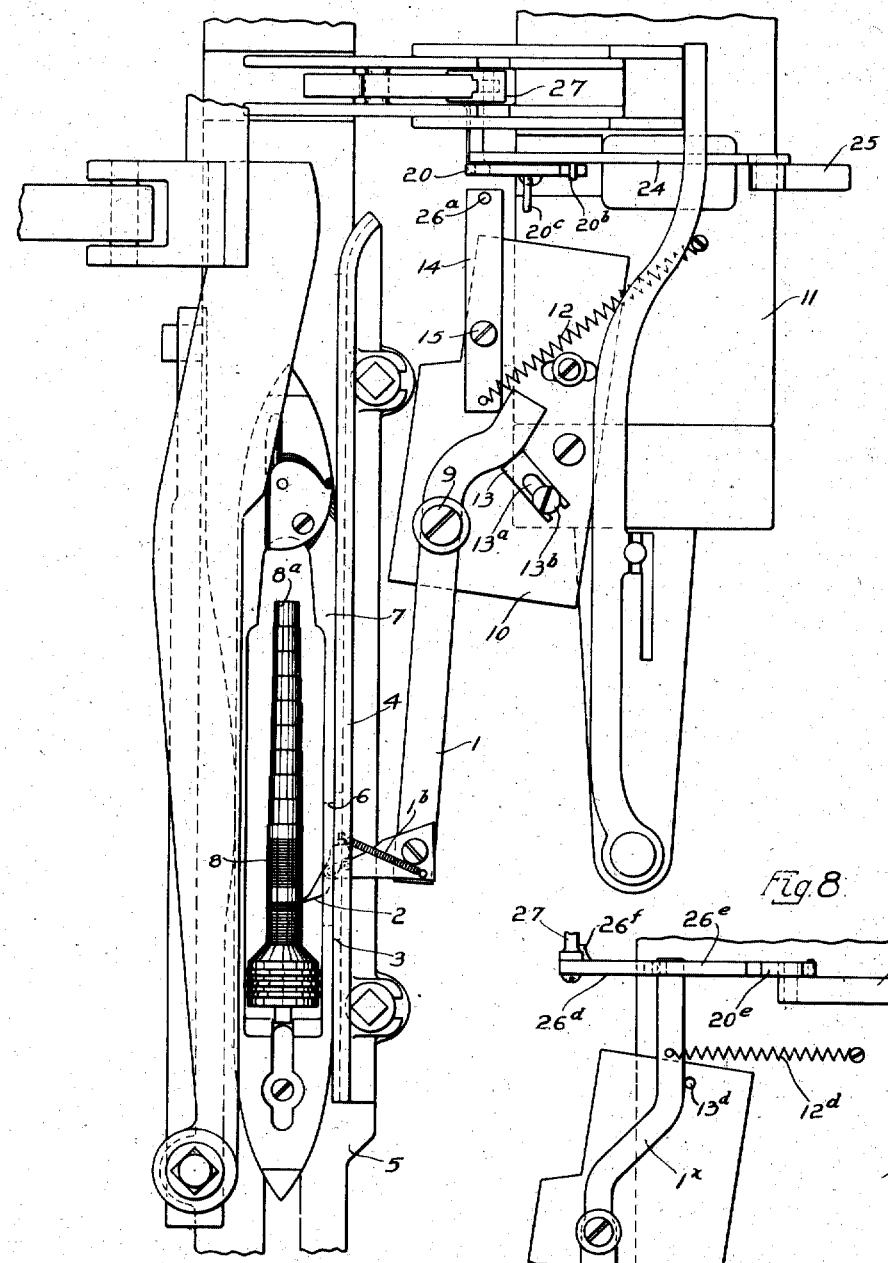

HENRY A. OWEN, OF WHITINSVILLE, MASSACHUSETTS, ASSIGNOR, BY MESNE ASSIGNMENTS, TO DRAPER CORPORATION, OF HOPEDALE, MASSACHUSETTS, A CORPORATION OF MAINE.

FEELER-MOTION FOR LOOMS.

1,278,731.

Specification of Letters Patent.

Patented Sept. 10, 1918.

Application filed October 2, 1914. Serial No. 864,549.

*To all whom it may concern:*

Be it known that I, HENRY A. OWEN, a citizen of the United States, residing at Whitinsville, in the county of Worcester, State of Massachusetts, have invented a certain new and useful Improvement in Feeler-Motions for Looms, of which the following is a specification, reference being had therein to the accompanying drawings.

My invention dispenses with the differential and other measuring principles which commonly are favored in practice in the case of the weft-feeler devices of looms. It comprises improvements in feeler-motions of those general classes in which the feeler makes feeling contact with the wound mass of weft or filling as a result of relative movement bringing the two together. One such general class comprises feeler-motions in which the stroke of the feeler is derived from the push of the wound supply of weft or filling, the feeler being mounted independently of the lay. Another comprises those feeler-motions in which the stroke of the feeler is terminated through the contact of the feeler with the wound supply, the feeler usually being mounted upon the lay.

In one broad aspect, the invention consists in a feeler-motion having a side-slipping contact-feeler that varies abnormally in the extent of its stroke when the predetermined stage of exhaustion of the wound supply of weft or filling takes effect upon it, and through such abnormal variation calls the desired change in the operation of the loom. The abnormal variation here intended is either a marked decrease, a complete or practically complete cessation, or a marked increase.

The invention in its broad phases is not necessarily restricted with respect to the precise modes in which the principle just set forth is embodied and applied, because such modes may be varied in practice in carrying the invention into effect.

In the preferred mode of reducing the principles of the invention to practice, I employ a feeler which is collapsible automatically in its effective length when the predetermined stage of exhaustion of the wound supply of weft or filling takes effect thereon. The embodiments of the said principles which are shown and described herein contain feelers which are collapsible by reason of being of knuckle-jointed construction. These feelers are constructed and arranged to break joint, or in other words cripple or buckle, so that thereby the effective length and the extent of the working stroke of a feeler shall be altered suddenly, when the filling-mass in the shuttle has become reduced to the predetermined minimum, and the resulting abnormal variation in the stroke of the feeler operates through the feeler's control of the devices for bringing about a change in the operation of the loom to call the said devices into action and thereby bring about such change.

The invention includes, in addition to the foregoing, special features of construction which are described hereinafter and particularly pointed out in the claims.

In the drawings,—

Figure 1 shows in plan certain portions of a loom with an embodiment of the invention applied thereto, the lay being at back center and a full supply of weft or filling being contained in the shuttle on the lay.

Fig. 1ª is a view in vertical section on line 1ª, 1ª, of Fig. 1.

Fig. 2, Sheet 2, shows the parts of Fig. 1 in end or side elevation.

Fig. 3, Sheet 3, is a plan view of the same parts but with the lay at front center.

Fig. 4, Sheet 2, is an end or side elevation of the parts in the positions occupied by them in Fig. 3.

Fig. 5, Sheet 4, is a plan view with the lay at front center, showing the supply of weft or filling nearly exhausted and the parts positioned to indicate automatic weft-replenishing mechanism into action.

Fig. 6, Sheet 2, is an end or side elevation of the parts as shown in Fig. 5.

Fig. 7, Sheet 3, is a plan view showing the preferred construction of feeler.

Fig. 7ª is a sectional detail of the feeler-tip on line 7ª, 7ª, of Fig. 7.

Fig. 7ᵇ is a side elevation of the adjustable acting portion of the feeler-tip of Figs. 7 and 7ª.

Fig. 7ᶜ is a section on line 7ᶜ, 7ᶜ, Fig. 7.

Fig. 8, Sheet 4, is a plan view showing a modification in the devices for calling the change in the operation of the loom.

Fig. 9, Sheet 4, is a side elevation of the devices of Fig. 8.

The drawings illustrate the application of the principles of the invention to feeler-motions of the first general class aforesaid, namely, those in which the stroke of the feeler is derived from the push of the wound supply of weft or filling; the application of such principles to feeler-motions of the second general class (in which the stroke of the feeler is terminated through the contact of the feeler with the wound supply) will be obvious to those skilled in the art without detailed explanation thereof.

Referring first to Figs. 1 to 6, the feeler comprises the carrier-member or carrier 1 and the tip 2. As in the case of the feelers of various prior feeler-motions in use, the feeler 1, 2, is supported on the loom-frame in a position which presents its tip 2 in line with an opening or slot 3 (dotted lines) in the front-plate 4 of one of the shuttle-boxes of the lay 5, and it is held yieldingly in a rearward position. As usual, as the lay swings forward the said tip projects through the said opening or slot 3 and also through a registering slot 6 (dotted lines) in the front-wall of a shuttle 7 that has passed home in the said shuttle-box, so that the tip receives against its extremity the pressure of the exterior of the wound supply 8 of weft or filling contained in the said shuttle. The movable mounting of the feeler which permits the feeler to be moved toward the front of the loom by the push of the said wound supply as usual in feeler-motions of this class, and which in practice may be provided for in any of the various modes heretofore known, is provided for by making the carrier-member or carrier 1 in the form of an arm or lever and pivoting the same at 9 upon a convenient support. Such support in this instance is a bracket 10 fixed on top of the breast-beam 11. The carrier-member or carrier 1 is supported by the upper surface of the bracket 10 in a manner permitting it to swing in a horizontal plane around the pivot 9. The means of holding the feeler normally in its rearward position with yielding force, and returning it rearwardly to such position after being moved forward therefrom, consists in this instance in a contracting spiral spring 12, which acts through a secondary lever 14 that is pivoted at 15 upon the bracket 10, one end of the spring being engaged with the secondary lever at 16 and the other end of the spring being engaged with the breast-beam at 17. The said rearward position is determined by a fixed stop 13 mounted upon the bracket 10. The spring holds the outer arm of the secondary lever 14 pressed against the inwardly extending arm of the carrier-member or carrier 1, and tends to press the said inwardly extending arm against the stop 13 so as to keep the feeler in its rearward position. Through the action of the spring the feeler and the secondary lever 14 are returned to their normal position after each feeling action. The control of the feeler over the devices for calling the change in the operation of the loom is described later herein.

The collapsibility of the feeler 1, 2, to which reference has been made is provided for in Figs. 1 to 6 by mounting the tip 2 in a manner giving it capacity to change its position with relation to the carrier-member or carrier 1. Considering this phase of the invention broadly, I do not restrict myself to any precise specific mode of securing this capacity. In this instance it is secured by pivoting the tip 2 at 2$^a$ upon a rearwardly extending plate 1$^a$ carried by the outer end of the carrier-member or carrier 1, so that the tip is capable of a lateral swinging movement upon the said pivot in a horizontal plane. By means of a spring, as 1$^b$, the tail-portion of the tip is held normally against a stop-pin 2$^c$ on the plate 1$^a$, thereby giving the acting extremity of the tip its working position at the rear end of the feeler where the wound supply of weft or filling may make contact with the same, and fixing the normal relation of the tip to the carrier-member 1, and the effective length of the feeler. The construction and arrangement are such that swinging movement of the feeler-tip away from its normal relation to carrier-member 1 operates to carry its engaging extremity forward relative to said carrier-member, and in this way the effective length of the feeler is reduced.

In order that the swinging of the feeler-tip 2 with relation to the carrier-member 1 may be brought about automatically at the proper time, the engaging extremity of the feeler-tip is located laterally (as well as rearwardly) of the pivot 2$^a$; that is to say, it is located at one side of the line of the axis of pivot 2$^a$. The purpose of this is to cause the pressure of the wound supply of weft or filling against the said extremity to act along a line passing at one side of the said axis, so that it shall have a tendency to turn the feeler-tip around the pivot 2$^a$ in the direction of the length of the shuttle.

The engaging extremity of the feeler-tip is wedge-shaped, with a comparatively blunt edge for contact with the wound mass of weft or filling contained within the shuttle 7. It is given the said shape in order that when the said edge contacts with a mass of weft or filling of any thickness it may indent the exterior of such mass slightly, and that when the said mass has become substantially exhausted the extremity may enter between the coils or turns and make contact with the surface of the weft-carrier upon which the weft or filling is wound.

Referring now to the operation, when, as in the drawings, the shuttle occupies the shuttle-box at the side of the loom at which the feeler is located, and the lay moves forward from its position in Figs. 1 and 2 to that in Figs. 3 and 4 so as to carry the shuttle toward the feeler and so that the feeler-tip enters slot 6 in the front shuttle-wall, the exterior of the wound mass of weft or filling contained in the shuttle will press against the engaging extremity of the feeler-tip as in Figs. 3 and 4. The push of the said mass, in consequence of taking effect against the feeler-tip at one side of the pivot $2^a$ connecting it with the carrier 1, will tend to cause the feeler-tip to swing or swivel around the said pivot. The tendency of the feeler-tip to swing or swivel around the said pivot will be opposed by the tension of the spring $1^b$, which however is light and offers only a slight resistance to the swinging or swiveling of the feeler-tip, and also will be opposed by the engagement of the engaging extremity of the feeler-tip with the exterior of the wound mass, in which the said extremity slightly embeds itself. So long as there is enough weft or filling in the shuttle to meet the more immediate needs in weaving, the hold of the comparatively firm mass of weft or filling upon the engaging extremity of the feeler-tip will prevent the feeler-tip from being swung transversely relative to the carrier 1 by the forward pressure of the wound supply of weft or filling against the said extremity. The feeler will remain unflexed and of its full working length, and the forwardly directed push against the extremity of its tip will have its full effect in moving the carrier-member 1 forward. The action is represented in Fig. 3, Sheet 3, and Fig. 4, Sheet 2. When, however, the wound supply of weft or filling within the shuttle becomes so far depleted as to permit the acting extremity of the feeler tip to make contact with a surface within the said wound supply which is more unyielding and less effective in holding the engaging extremity of the feeler-tip from slipping laterally, as for instance the surface of the bobbin $8^a$ or other filling-carrier within the shuttle, a different action will take place. The push of the said surface against the engaging extremity of the feeler-tip will materially increase the tendency to swing the feeler-tip around the pivot $2^a$ against the tension of the spring $1^b$. When the number of coils of weft or filling covering the said surface has become insufficient to resist effectually the tendency of the extremity of the feeler-tip to deflect laterally, the said surface will deflect the said extremity in such direction, as indicated in Fig. 5, Sheet 4. The consequent swinging or turning of the feeler-tip around its pivot will cause the feeler to break joint, involving a crippling or buckling of the feeler, and in effect a collapse in the effective length thereof, as in Fig. 5, the consequence of which will be a fairly material difference in the extent of the stroke that is communicated to the feeler. That is to say, the said stroke will be abnormally reduced, namely by an amount perceptibly greater than that due to the mere reduction in diameter of the wound supply of weft or filling which is incidental to the paying-out of weft or filling from the shuttle. In practice, I have found it convenient to effect in this manner a complete or practically complete cessation of the movement of the feeler.

As in the case of various other feeler-motions employing contact-feelers, the stroke communicated to the feeler 1, 2, remains unchanged in extent until the portion of the wound supply that makes contact with the feeler-tip begins to diminish in diameter in consequence of the paying-out of weft or filling from the shuttle. Thereafter, by reason of such decrease in diameter, the stroke diminishes normally and gradually in proportion as the diameter of the said portion decreases, but this normally progressing diminution of the feeler-stroke does not call the change. It is merely preliminary to the abnormal variation in the extent of the feeler-stroke which does call the change when the predetermined stage of exhaustion of the wound supply of weft or filling takes effect upon the feeler.

The precise character and arrangement of the devices for calling the desired change in the operation of the loom, and the precise manner and means of controlling the action of the said device through the stroke of the feeler, are not in themselves of the gist of the invention and may vary in practice, although certain of my claims hereinafter cover sub-combinations in which a dog that forms a part of such devices is included as an element. All, so to speak, that is required concerning the said devices is that they should be made responsive to an abnormal variation in the stroke of the feeler, or otherwise to the variation in the effective length of the feeler. The prior art contains various forms and arrangements of devices for the purpose stated, and various ways of controlling the said devices from or by the feeler, many of which may be adopted in carrying the principles of my invention into effect. I have shown in Figs. 1 to 6 one form and arrangement, the same including a dog 20, shown best in Fig. $1^a$, which is mounted pivotally at 23 upon a link or extension 24 extending rearward from an arm 25 mounted upon the usual breast-beam rockshaft (not shown), the dog and arm being combined operatively in practice with automatic weft-replenishing mechanism, or other mechanism for bringing about the desired change in the operation of the loom. The dog 20 is formed at the underside of its rear end with a tooth or shoulder 20<sup>a</sup>, Fig. 1<sup>a</sup>, designed to be engaged by a striker 26 constituted by a lateral projection from the weft-hammer lever 27. It is overbalanced or over-weighted at the rear of its pivot 23 so that its toothed or shouldered portion gravitates downward into the position shown in Fig. 1<sup>a</sup> and normally occupies the said position, which is determined by the engagement of its projecting tail with the stop-pin 20<sup>b</sup> carried by the link 24. In this position of the dog its tooth or shoulder 20<sup>a</sup> is located in the path of movement of the striker 26. The engagement of the dog by the striker 26 is designed to take place in the forward movement of the said striker, under the control of the feeler. The control may be direct, but in this instance the control is effected through the secondary lever 14, which may be termed specifically a controller for the dog. The said lever 14 controls the dog by means of an upwardly projecting pin 26<sup>a</sup> with which the lever is furnished, the said pin being located close behind a pin 20<sup>c</sup> projecting outwardly from the dog 20 above the pivot 23 of the latter. In the normal position of the feeler and controller the position of the pin 26<sup>a</sup> is such as to permit the dog to gravitate into its normal position shown in Fig. 1<sup>a</sup>, namely with its tooth or engaging portion 20<sup>a</sup> disposed suitably to be engaged by the striker 26 as the striker goes forward. The movement of the lever 14 which results when movement is communicated to the feeler by forward pressure of the mass of filling 8 against the tip or acting portion of the feeler causes the pin 26<sup>a</sup> to act against the pin 20<sup>c</sup> to tilt the dog and move the tooth or shoulder 20<sup>a</sup> out of the path of movement of the striker.

The construction just described is intended to act to cause the tooth or shoulder 20<sup>a</sup> of the dog to be lifted out of the path of the striker 26 through the pressure of the wound mass of filling 8 against the feeler so long as the said mass exceeds the predetermined minimum, but to permit the said tooth or shoulder to remain in the said path when the quantity of filling remaining in the shuttle has become reduced to the said minimum and the predetermined abnormal variation in the stroke of the feeler takes place. The said abnormal variation may amount to a complete or practically complete cessation of the movement of the feeler.

Provision for shifting the normal position of the feeler-tip forward or rearward in the loom, so as to cause it to be encountered by the wound supply of weft or filling either later or earlier in the forward stroke of the lay, according as may be found necessary, may be made in various ways. Herein it is made by rendering the stop 13 adjustable. The adjustability of the stop is secured by forming a longitudinal slot 13<sup>a</sup> in the same for the stem of the screw 13<sup>b</sup> which holds the stop in place upon the bracket 10. The slot enables the stop to be adjusted lengthwise, and by such adjustment of the stop the normal position of the feeler as assumed by the latter under the action of the spring 12, and consequently the normal position of the feeler-tip, may be varied as required in practice.

For practical reasons, I prefer a swinging mounting of the feeler substantially like that herein shown, as it involves a comparatively inexpensive construction as well as provides for free and easy movement of the feeler. Other forms and arrangements of feelers and mountings that are suitable are known in the art, and may be employed in cases in which it is not deemed necessary to secure the special advantages that are inherent in the swinging mounting.

In virtue of mounting the feeler to swing like an arm or lever there is no tendency to cramping of the feeler in its movement. The action is better than would be the case if it were mounted to slide in a straight guideway or ways, for the pressure of the forwardly moving wound mass of weft or filling against the engaging extremity of the feeler-tip in the latter instance would tend to cause the feeler to cramp in the said guideways or way. I contemplate mounting the feeler to move in a guideway or ways in some cases, however.

It is intended in the case of the illustrated forms of feeler-tips that when the wound weft or filling upon the barrel of the filling-carrier 8<sup>a</sup> at the point where the engaging extremity of the feeler-tip engages is reduced to a single layer as in Fig. 5, the said engaging extremity shall penetrate between the coils or turns and make contact with the surface of the filling-carrier under them. The tendency of the pressure of said surface against the engaging extremity of the feeler-tip to displace the latter laterally will cause then the engaging extremity to press some of the said coils or turns outward, making an opening between them as in Fig. 5. In case the first contact of the engaging extremity with the surface of the filling-carrier should not operate to displace the feeler-tip, the spreading apart of the coils or turns will facilitate the further displacement of the feeler-tip so that on the second or third contact the crippling or buckling of the feeler and reduction of its effective length will be made complete. So long as there are at least two cross-wound overlying layers of coils or turns at the place where the engaging extremity of the feeler-tip engages with the wound weft or filling the crossing of the wind of one layer by that of another will bind the coils or turns together so that lateral displacement of the feeler-tip will be prevented. Hence with feeler-tips having engaging extremities like those shown in the drawings, the abnormal variation in the stroke of the feeler will seldom if ever take place before the wound supply of weft or filling has been reduced to a single layer.

The distance of the engaging portion or extremity of the feeler-tip laterally outward from the pivot 9 is sufficient to cause the said extremity to travel in an outwardly convex arc of comparatively slight curvature. An advantage of this is the fact that the said engaging extremity has a compound or combined forward and outward movement. The effect of this is to cause the said engaging extremity to dip or pick under the coils or turns of the yarn next outward beyond the same, so as the more effectually to engage with such coils or turns. This has the double effect of holding the feeler-member with greater certainty from premature lateral displacement outward, and of facilitating the separating of the coils or turns after the weft or filling has become reduced to a single layer.

The lateral offsetting of the engaging extremity of the feeler-tip is toward the side of the pivot $2^a$ at which the head or base of the filling-carrier $8^a$ is located, in order that the tendency for lateral displacement of the said acting extremity may manifest itself in the direction toward the said head or base. The reason for this is the fact that since the weft or filling is wound first in layers of short length at and near the head or base of the filling-carrier there is less tendency to premature displacement of the coils or turns of the first or innermost layer in the said direction when such layers are exposed to being engaged by the tip of the feeler-member than there would be in a direction toward the tip of the feeling-carrier.

Figs. 8 and 9, Sheet 4, show devices for calling the change that differ somewhat in character and mode of operation from those of Figs. 1 to 6. It has been explained that in the case of the latter the dog 20 gravitates into position to be engaged by the striker 26, and that the movement of the feeler and secondary lever 14 that is due to the push of the wound supply of weft or filling operates through the pressure of the pin $26^a$ of said lever against the pin $20^c$ of the dog to cause the dog to be tilted out of the path of the striker. The secondary lever 14 is employed partly for the purpose of securing the required range of movement in the case of the pin $26^a$, and partly for the purpose of changing the direction of the transmitted movement derived from the feeler so that the said pin $26^a$ shall act properly against the pin $20^c$ to tilt the dog as the feeler is pushed forward by the weft or filling.

The dog $20^d$ of Figs. 8 and 9 also is a gravitating dog. It differs in working from the dog of Figs. 1 to 6 in that it tends to gravitate out of the path of the striker $26^d$ and in several other respects. It is kept at times in the said path by means of the inwardly extending arm $1^x$ of the feeler which, in Figs. 8 and 9, is utilized to support the dog at such times. When the feeler occupies its normal position, as determined by the stop $13^d$ against which it is held by the action of the spring $12^d$, the said arm holds up the engaging portion of the dog as in Fig. 9 in the path of the striker. The stroke of the feeler produced by the push of the wound supply of weft or filling as the lay goes forward swings the feeler-arm $1^x$ rearward out of engagement with the dog, permitting the dog to gravitate out of the path of the striker, and down in front of said arm, so that the forwardly moving striker passes over the dog without engaging with the latter. For the purpose of resetting the dog, a prolongation or finger $26^e$ is provided upon the striker. In the advance of the striker this finger engages with an upstanding toe or projection $20^e$ of the dog, and operates to swing the dog upon its pivotal connection with the arm 25 high enough to permit the inwardly extending arm of the feeler to pass under the same again. The said arm having resumed its position under the dog, the striker returns to its rearward position. The striker is connected pivotally to the weft-hammer lever 27 by which it is supported and actuated, in order to permit the striker to swing upward in unison with the dog. A stop-lug $26^f$ projecting from the striker near its pivot engages with the lever 27 to prevent the striker from swinging down too low. When the stroke of the feeler ceases or becomes abnormally reduced through exhaustion of the wound supply of weft or filling, the arm $1^x$ of the feeler remains under the dog, supporting the latter in position to be engaged by the striker. The latter acts in its advance to push the arm 25 forward and call the change in the operation of the loom.

The acting extremity of the feeler-tip may be integral with the other portions of the feeler-tip, but I contemplate in some cases forming the said acting extremity as a separate piece and attaching it to the body of the feeler-tip. Fig. $7^b$, Sheet 3, shows separately what may be called a feeler-point, it being in the form of a short rod 1$^k$ having one end thereof beveled off on opposite sides to render the said end wedge-shaped. The said rod is shown as of cylindrical cross-section, but the shape in cross-section may vary in practice. For the convenient mounting of the feeler-point in connection with the body of the feeler-tip I have shown the said body formed with a split socket 1$^m$, Figs. 7, 7$^a$, to receive the feeler-point, the said split socket being furnished with a screw 1$^n$ by which its side-portions may be drawn together to clamp the feeler-point between them. This construction provides for the complete convenient application or removal of the feeler-point, and for adjustment of the latter in the direction of its length to vary the distance of its apex from the pivot 2$^a$ of the feeler-tip.

The material of the feeler-tip may vary in practice. The same may be composed altogether of metal, or altogether of other material such as so-called "fiber", of which vulcanized fiber is an instance. Or the tip-body may be composed of one material, as metal, and the feeler-point (when made as a separate piece) of another, as fiber. The shape of the apex may vary, and the sharpness thereof.

Fig. 7$^c$ shows a convenient manner of mounting the feeler-tip upon the carrier-member 1 so as to obviate liability of the pivot 2$^a$ to work loose when the said pivot is constituted by a screw. The pivotal screw 2$^a$ is formed next adjoining its flange-like head with a smooth cylindrical body of a length just exceeding the thickness of the body of the feeler-tip, with a shoulder at the lower end of the said cylindrical body, and with a screw-threaded stem below such shoulder. The said screw-threaded stem is screwed into a threaded hole that is tapped into the carrier-member 1, until the said shoulder is tightened up against the upper surface of the carrier-member. The distance between the underside of the flange of the head of the screw is just sufficient to permit the feeler-tip to work freely without vertical play, and the screw cannot be tightened up so as to cause the feeler-tip to bind.

In order to preserve simplicity in the showing in Figs. 1 to 6 I have represented a simple contracting spring 1$^b$ employed to hold the feeler-tip in its normal position upon the carrier or carrier-member. In practice it is desirable to have provisions for adjusting the tension of the feeler-tip, and to this end I provide means for adjusting the tension of the feeler-tip spring, such means being omitted from Figs. 1 to 6. Means for this purpose is shown in Fig. 7, in which I have shown also a different form of spring comprising a long arm which acts upon the feeler-tip. The spring 1$^d$ of Fig. 7 is composed of a straight length of spring-material, shown as a wire, although a blade-spring might be employed. One end of the spring is engaged with the feeler-tip and the other is made fast by means of a clamping screw 1$^e$ in a suitable socket that is provided in connection with a forward extension 1$^f$ of the carrier or carrier-member 1. The adjustment provisions comprise a screw 1$^g$ working in a threaded hole that is tapped through the extension 1$^f$ and engaging with the spring. One end of this screw engages with the spring so as to control the latter, and by adjustment of the screw the spring may be flexed to the extent required for opposing the proper degree of resistance to the turning of the feeler-tip upon its pivot under the push of the wound supply of weft or filling thereagainst.

Through adjustment of the tension of the feeler-tip the readiness with which the latter yields so as to become laterally displaced may be regulated for the purpose of securing the desired action in practice. With the same general purpose in view I make provisions for varying the extent to which the acting extremity of the feeler-tip is offset laterally with respect to the line of the pivotal axis of the feeler-tip. It will be obvious that the greater the extent of the lateral off-setting, the more advantageous will be the leverage, and the more readily will the feeler-tip tend to displace laterally upon the carrier-member or carrier. The contrary will be the case the less the extent of the lateral offsetting. These last mentioned provisions comprise the adjustable stop-screw 1$^s$, Fig. 7, having its threaded stem fitted to a threaded hole that is tapped through a lug 1$^t$ of the carrier-member 1, the inner end of the said stem being disposed in position to engage with the feeler-tip as the latter is turned upon its pivot through the action of the spring. By adjustment of this screw the extent to which the feeler-tip is permitted to turn around its pivot under the action of the spring may be varied as required, and thereby the extent to which the acting extremity of the feeler-tip is offset when in its normal position may be varied as may be required in order to secure the desired results in operation. 1$^u$ is a locknut upon screw 1$^s$.

Various changes and modifications in addition to those indicated herein may be made in the construction and arrangement of the parts.

An advantage inherent in a feeler having a tip or contact-point composed of fiber or equivalent material is that it does not indent or wear the surface of the filling-carrier through the mutual impact, as does a narrow or wedge-shaped contact-point, or tip made of hard material such as metal.

I claim as my invention,—

1. A feeler-motion for looms comprising a support, a feeler carrier mounted thereon for normal displacement in the direction of the lay's advance, a side-slipping feeler tip capable of swinging laterally on said feeler carrier, said tip being actuated by the push of the wound mass of weft or filling and imparting the said normal displacing movement to said carrier and by its slipping adapted to produce an abnormal variation in the degree of said displacement, in combination with changing mechanism and means controlled by said carrier and in turn controlling the changing mechanism whereby the latter is rendered operative by the said abnormal variation.

2. A feeler motion for looms comprising a side-slipping feeler tip engaged by the wound mass of weft, a member receiving a normal displacement stroke in the direction of the lay's advance imparted to it from the filling through said feeler tip, the side-slipping movement of the feeler being relative to said member, loom changing mechanism and means whereby the normal stroke of said member is made effective to hold said mechanism inactive.

3. A feeler-motion having a feeler actuated by the push of the wound mass of weft or filling against a tip which displaces longitudinally of the shuttle under the said push when the supply of weft or filling is substantially exhausted, and having combined with the said tip a swinging spring arm operatively engaging by a swinging portion thereof with the said tip and controlling the tendency to lateral displacement, and means to adjust the tension of the said arm by flexure thereof to thereby regulate the displacing action.

4. A feeler-motion having a feeler actuated by the push of the wound mass of weft or filling against a tip which displaces in the direction of the length of the shuttle about an axis of displacement under the said push when the supply of weft or filling is substantially exhausted, and having combined with the said feeler-tip adjusting means for varying the distance to which the normal working position of its pressure-receiving extremity is offset relative to the line of the said axis.

5. A feeler-motion having a feeler actuated by the push of the wound mass of weft or filling against a tip which displaces in the direction of the length of the shuttle about an axis of displacement under the said push when the supply of weft or filling is substantially exhausted, and having combined with the said feeler-tip an adjustable stop by which the normal working position of the pressure-receiving extremity, is determined and by adjustment of which the distance to which the said extremity is offset relative to the line of the said axis may be varied.

6. A feeler-motion having a feeler actuated by the push of the wound supply of weft or filling against a tip which displaces in the direction of the length of the shuttle about an axis of displacement under the said push when the supply of weft or filling is substantially exhausted, and having combined with the said feeler-tip a spring which controls the tendency to displacement, and an adjustable stop by which the normal working position of the pressure-receiving extremity of the feeler-tip is determined and by adjustment of which the distance to which the said extremity is offset relative to the line of the said axis may be varied.

7. A feeler-motion having a feeler actuated by the push of the wound supply of weft or filling against a pivotally-mounted feeler-tip which is displaced by a swinging movement in the direction of the length of the shuttle under the said push when the said supply is substantially exhausted, a spring which tends to hold the feeler-tip in normal working position and controls the tendency to displacement, and an adjusting-screw by which the said working position is determined and by adjustment of which the distance to which the pressure-receiving extremity of the feeler-tip is offset relative to the line of the pivotal axis may be varied.

8. A feeler motion for looms comprising a carrier lever subject to displacement in the direction of the lay's advance, loom changing mechanism controlled by an abnormal variation in said displacement, a side-slipping feeler tip actuated by the push of the wound mass of filling, normally transmitting the full extent of the said push to the said lever and a knuckle-joint mounting for said tip whereby it imparts less of said push to the lever when it slips on the filling.

9. A feeler motion for looms comprising a carrier lever subject to displacement in the direction of the lay's advance, a secondary lever operated thereby, a dog controlled by said secondary lever and loom changing mechanism controlled by said dog, in combination with a side-slipping feeler actuated by the push of the wound mass of filling and normally transmitting the full extent of said push to said lever and a knuckle-joint mounting for said tip whereby it imparts less of said push when it slips on the filling.

10. A feeler-motion comprising, in combination with the lay and suitable changing mechanism, a support, a feeler-carrier having a mounting on said support whereby it normally reciprocates forward and rearward with respect to the directions of advance and retreat of the lay, a feeler constructed and jointed to the feeler-carrier so as to slip lengthwise of the shuttle and transversely to the direction of normal movement of the feeler-carrier and relatively to the feeler-carrier when the supply of weft or filling is substantially exhausted, thereby causing an abnormal variation in the degree of said movement of the feeler-carrier, and a controller for the changing mechanism actuated by the feeler-carrier and affected by said abnormal variation so as to cause the operation of the changing mechanism.

In testimony whereof I affix my signature in presence of two witnesses.

HENRY A. OWEN.

Witnesses:
NATHAN B. DAY,
ELLEN O. SPRING.